United States Patent [19]

Okonogi et al.

[11] Patent Number: 4,865,915

[45] Date of Patent: Sep. 12, 1989

[54] RESIN COATED PERMANENT MAGNET

[75] Inventors: Itaru Okonogi; Yukihiko Shiohara; Mitsuru Sakurai; Masahiro Ota, all of Nagano, Japan

[73] Assignee: Seiko Epson Corporation, Tokyo, Japan

[21] Appl. No.: 169,530

[22] Filed: Mar. 17, 1988

[30] Foreign Application Priority Data

Mar. 31, 1987 [JP] Japan ................................ 62-78237
Mar. 31, 1987 [JP] Japan ................................ 62-78239
Aug. 19, 1987 [JP] Japan ................................ 62-205609

[51] Int. Cl.[4] ........................ B32B 9/00; H01F 3/00; B05D 5/12

[52] U.S. Cl. .................................. 428/336; 428/421; 428/422; 428/692; 428/900; 148/101; 335/303; 427/127; 427/130

[58] Field of Search ............... 428/900, 421, 422, 692, 428/336; 335/303; 148/101; 427/127, 130

[56] References Cited

U.S. PATENT DOCUMENTS

| | | | |
|---|---|---|---|
| 3,505,167 | 4/1970 | Smarook | 428/422 |
| 4,504,327 | 3/1985 | Inomata et al. | 428/900 |
| 4,696,725 | 9/1987 | Ochiai et al. | 428/900 |

FOREIGN PATENT DOCUMENTS

| | | | |
|---|---|---|---|
| 0101552 | 2/1984 | European Pat. Off. . | |
| 0108474 | 5/1984 | European Pat. Off. . | |
| 0022302 | 2/1984 | Japan . | |
| 0158812 | 7/1988 | Japan | 335/303 |

*Primary Examiner*—George F. Lesmes
*Assistant Examiner*—Nizar M. Irahim
*Attorney, Agent, or Firm*—Blum Kaplan

[57] ABSTRACT

A waterproof resin coated permanent magnet is provided. The resin coating is either a waterproof fluoroplastic resin material or a mixture of fluoroplastic resin material and at least one organic resin such as epoxy resin, polyester resin, acrylic resin, phenol resin and mixtures thereof. The magnet has superior corrosion and weathering resistance.

17 Claims, No Drawings

RESIN COATED PERMANENT MAGNET

BACKGROUND OF THE INVENTION

This invention relates generally to resin coated permanent magnets and in particular, to a permanent magnet having a waterproof organic resin coating to provide superior oxidation resistance and strength.

Permanent magnets include ferrite magnets, alnico magnets and rare-earth magnets. The demand for rare-earth magnets has grown in proportion to the growing demand for smaller and higher efficiency electrical appliances for office automation such as computers, word processors and facsimile machines.

Rare-earth magnets are grouped into three classes by method of manufacture. These classes include sintered magnets, bonded magnets and cast magnets.

Typical rare-earth magnets are also grouped by composition. Specifically, rare-earth magnets include a rare-earth metal in combination with either cobalt or ferrite.

European Patent No. 108474 issued to General Motors Corp. discloses a rare-earth magnet including a rare-earth metal and iron which is obtained by a rapid quenching method. In the rapid quenching method, a ribbon-like material having a thickness of 20 $\mu m$ is provided. The ribbon-like material is an aggregate of crystals having a diameter between about 0.1 and 0.5 $\mu m$, which is smaller than the critical diameter of a uniaxial particle. The material is pulverized to a particle size of less than about 177 $\mu m$ while maintaining coercive force and the pulverized material is used to form a resin bonded magnet.

Rare-earth magnets are further classified into two groups based on the coercive force mechanism of the magnet. One of the groups includes those rare-earth magnets which function in accordance with a 1–5 system magnetic model. These include rare-earth transition metal compounds having formulas such as $SmCo_5$, $CeCo_5$, $Sm_{0.5}Ce_{0.5}Co_5$, $YCo_5$, $PrCo_5$ and $Sm(CoCu)_5$. Nuclear magnetic intermetallic compounds of at least one rare-earth metal and at least one transition metal including magnets based on R-Fe-B are also included in this group.

The second type of permanent magnets function in accordance with a planning model of 2–17 system magnets. These two-phase separate type or analysis hard type magnets include rare-earth transition metal intermetallic compounds having formulas such as:

$$Sm(Co_{bal}Cu_{0.05}Fe_{0.02}Zr_{0.02})_{8.0}$$

$$Sm(Co_{bal}Cu_{0.06}Fe_{0.022}Ti_{0.016})_{7.6}$$

$$Sm_{0.8}Y_{0.2}(Co_{bal}Cu_{0.06}Fe_{0.20}Nb_{0.018})_{7.8}$$

$$Sm_{0\ 7}Ce_{0.3}(Co_{bal}Cu_{0.06}Fe_{0.24}Zr_{0.02})_{7.8} \text{ and}$$

$$Sm_{0\ 5}Pr_{0.5}(Co_{bal}Fe_{0.3}Cu_{0.07}Zr_{0.02})_{7.6}.$$

The amount of cobalt is approximately 0.91. However, this amount is specified as a balance since a limited amount of impurities may be included.

Rare-earth transition metal intermetallic compounds including rare-earth metals, transition metals and semimetals or semiconductor elements are reactive with oxygen. Specifically, the magnetic surface reacts with atmospheric oxygen to create rust. R-Fe-B magnets cause particular problems. When R-Fe-B magnets are incorporated into motors, relays and the like, oxides produced on the surface of the magnet are removed as the equipment operates and cause such significant problems in the equipment that the magnet itself is unsuitable for practical use.

European Patent No. 101552 issued to Sumitomo Tokushu Kinzoku Kabushiki Kaisha relates to rare-earth iron series permanent magnets obtained by a sintering method and consisting primarily of neodymium, iron and boron. However, the European patent does not recognize that rusting is a problem.

Japanese Patent Laid-Open Application No. 56-81908 discloses that rust can be prevented by coating a resin such as an epoxy resin on a rare-earth magnet. However, subtle pin-holes are generated in the plating or coating layer and it is difficult to prevent these pin-holes. As a result, rust occurs when water contacts the magnet through pin-holes in the coating layer.

The pin-holes are generated because the magnets do not have an entirely uniform planar or mirror surface. Rather, the rare-earth magnets have subtle uneven irregularities or spaces between magnetic particles. The resin can therefore not be coated uniformly.

Furthermore, solvent in the plating or coating solution is volatilized when the layer dries even when the layer is coated as uniformly as possible. Pin-holes occur at the volatilized portions. For these reasons, it is extremely difficult to provide a coating layer on a rare-earth magnet without generating pin-holes.

The generation of pin-holes is not a significant problem in prior art magnets such as Sm-Co magnets which include only a small amount of iron. In contrast, prior art magnets including a rare earth metal and a large amount of iron are apt to rust. When these magnets are incorporated into rotating machines such as motors, VCMs, speakers and relays to provide a magnetic circuit the rust which has been generated causes the magnetic performance to deteriorate for the reasons discussed.

Accordingly, it is desirable to provide an improved permanent magnet having superior corrosion and weathering resistance.

SUMMARY OF THE INVENTION

Generally speaking, in accordance with the invention a permanent magnet having a waterproof coating of an organic resin yielding a permanent magnet of superior corrosion and weathering resistance is provided. The waterproof resin coating includes a fluorine resin (or fluoroplastic) or a mixture of fluorine resin and at least one additional organic resin, such as an epoxy resin, polyester resin or phenol resin. When a mixture of resins is used, the fluorine resin is present in an amount between about 2 and 70% by weight. In all cases, the waterproof organic resin material is coated on the permanent magnet to a thickness between about 1 and 50 $\mu m$.

The permanent magnet member to be coated in accordance with the invention can be of the sintered, bonded or cast type. In one preferred embodiment of the invention, the permanent magnet is a powder bonded permanent magnet which is a composite of particles of a rare-earth magnet and organic bonding materials. A thermosetting resin can be dispersed throughout the permanent magnet material prior to forming the magnet and coating on the permanent magnet to a thickness of between about 1 and 50 $\mu m$ with the waterproof organic resin material.

The fluorine resins used in the waterproof organic resin coatings in accordance with the invention include 4-fluorinated ethylene resin (PTFE); a copolymer resin of 4-fluorinated ethylene and per-fluoroalkoxyethylene (PFA); a copolymer resin of 4-fluorinated ethylene and 6-fluorinated propylene (FEP); a copolymer resin of 4-fluorinated ethylene, 6-fluorinated propylene and per-fluoroalkoxyethylene (EPE); a copolymer resin of 4-fluorinated ethylene and ethylene (ETFE); a copolymer resin of 3-fluorinated ethylene chloride (PCTFE); a copolymer of 3-fluorinated ethylene chloride and ethylene (ECTFE); a fluorinated vinylidene resin (PVDF); fluorinated vinyl resin (PVE) and mixtures thereof. The resin coated permanent magnet does not develop pinholes in the coating layer and has superior corrosion and weathering resistance.

Accordingly, it is an object of the invention to provide an improved rare-earth magnet having superior corrosion and weathering resistance.

Another object of the invention is to provide a rare-earth magnet that does not rust.

A further object of the invention is to provide a rare-earth magnet with a surface that does not deteriorate.

Still another object of the invention is to provide a magnet that is resistant to damage.

Yet another object of the invention is to provide a powder bonded permanent magnet including particles of a rare-earth magnet and a bonding material.

Still a further object of the invention is to provide a powder bonded permanent magnet having a thermosetting resin penetrated therein.

Yet a further object of the invention is to provide a fluoroplastic coating layer for a permanent magnet.

A further object of the invention is to provide a waterproof permanent magnet.

Another object of the invention is to provide a waterproof coating for a sintered, bonded or cast permanent magnet.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

DESCRIPTION OF THE PREFERRED EMBODIMENTS

The waterproof organic resin coated permanent magnets provided in accordance with the invention can include any type of permanent magnet member including sintered, bonded and cast permanent magnets. The preferred waterproof organic resins for the coating are fluorine resins to provide a waterproof coating which means that water is repelled under conditions of high humidity.

The fluorine resins which may be used in accordance with the invention include 4-fluorinated ethylene resin (PTFE) having the structure $$(-CF_2-CF_2)_n$$

wherein n is an integer; a copolymer resin of 4-fluorinated ethylene and perfluoroalkoxyethylene (PFA) having the structure $$(-CF_2-CF_2)_m(-CF_2-\underset{\displaystyle OR_f}{\underset{|}{CF_2}})_n$$

wherein $R_f$ is an per-fluoroalkyl group and m and n are independently selected integers; a copolymer resin of 4-fluorinated ethylene and 6-fluorinated propylene (FEP) having the structure $$(-CF_2-CF_2)_m(-CF_2-\underset{\displaystyle CF_3}{\underset{|}{CF}})_n$$

wherein m and n are independently selected integers; a copolymer resin of 4-fluorinated ethylene, 6-fluorinated propylene and per-fluoroalkoxyethylene (EPE) having the structure $$(-CF_2-CF_2)l(-CF_2-\underset{\displaystyle CF_3}{\underset{|}{CF}})_m(-CF_2-\underset{\displaystyle OR_f}{\underset{|}{CF}})_n$$

wherein $R_f$ is an per-fluoroalkyl group and l, m and n are independently selected integers; a copolymer resin of 4-fluorinated ethylene and ethylene (ETFE) having the structure $$(-CF_2-CF_2)_m(-CH_2-CH_2)_n$$

wherein m and n are independently selected integers; a copolymer resin of 3-fluorinated ethylene chloride (PCTFE) having the structure $$(-CF_2-CFCl)_n$$

wherein n is an integer; a copolymer resin of 3-fluorinated ethylene chloride and ethylene (ECTFE) having the structure $$(-CF_2-CFCl)_m(-CH_2-CH_2)_n$$

wherein m and n are independently selected integers, fluorinated vinylidene resin (PVDF) having the structure $$(-CF_2-CH_2)_n$$

wherein n is an integer; and fluorinated vinyl resin (PVE) having the structure $$(-CHF-CH_2)_n$$

wherein n is an integer.

The fluorine resins can be used alone to form the waterproof coating or may be used in combination with an additional organic resin, such as epoxy resin, polyester resin or phenol resin. The proportion of fluoroplastics should be between about 2 and 70% by weight when the fluoroplastic is used in combination with an organic resin. The coating layer does not have superior weathering properties when the proportion of fluoroplastics is less than about 2% by weight. It is difficult to obtain a uniform mixture of fluorine resin and the additional resin and the coating layer tends to have an uneven surface and low strength when the proportion of fluorine resin exceeds about 70% by weight of the coating composition.

Desirable effects are achieved when the fluorine resin is used alone. However, the results are superior when the fluorine resin is mixed with a second waterproof organic resin such as epoxy resin, acrylic resin, phenol resin and the like.

The fluorine resin or mixed layer of fluorine resin and additional organic resin is coated on the magnet to a thickness between about 1 and 50 μm. It is difficult to maintain reliability of the coating layer because an uneven layer develops when the thickness is less than about 1 μm. On the other hand, the time it takes to prepare a thick layer and consequently the cost involved is not practical for coating layers having thicknesses greater than about 50 μm.

A mixture of fluorine resin and additional organic resin adheres to a magnet better than a fluorine resin alone. This is particularly true when the magnet includes intermetallic compounds. In general, it is necessary to heat treat a magnet to a temperature between about 100° and 900° C. in order to achieve adherence when the magnet is coated with fluorine resins alone. However, the magnetic properties are lowered by heat treatment which may make the magnet no longer suitable for practical use. By mixing an additional organic resin with the fluorine resin, it is possible to maintain the water repellancy of the coating and obtain high performance of the magnet while advantageously enhancing adherence and durability.

The permanent magnets are coated with the coating material by physical or chemical methods. The waterproof coating layer having a thickness of greater than about 1 μm prevents the iron in the magnet from reacting with water to form rust. Specifically, the substitution reaction between Fe and H-OH (in water) to form $Fe(OH)_3$ is prevented.

In a preferred embodiment, the fluorine resin or mixed fluorine resin and additional organic resin material is coated on a powder bonded permanent magnet. In another preferred embodiment, the powder bonded permanent magnet has a thermosetting resin dispersed throughout the magnet composition. When a thermosetting resin is penetrated into the powder bonded permanent magnet, it is only necessary for the coating layer to be between about 1 and 50 μm thick.

The powder bonded permanent magnets can be selected from the following:

1. Intermetallic compounds formed from a rare-earth metal and cobalt. This is referred to as a 1-5 system rare-earth magnet and includes compounds of formulas such as $SmCo_5$, $CeCo_5$, $Sm_{0.5}Ce_{0.5}Co_5$, $YCo_5$, $PrCo_5$ and $Sm(CoCu)_5$; and 2. Rare-earth transition metal intermetallic compounds, which are known as 2-17 system rare-earth transition metal compounds. These compounds have formulas such as $Sm(Co_{bal}Cu_{0.05}Fe_{0.02}Zr_{0.02})_{8.0}$, $Sm(Co_{bal}Cu_{0.06}Fe_{0.22}Ti_{0.016})_{7.6}$, $Sm_{0.8}Y_{0.2}(Co_{bal}Cu_{0.06}Fe_{0.20}Nb_{0.018})_{7.8}$, $Sm_{0.7}Ce_{0.3}(Co_{bal}Cu_{0.06}Fe_{0.24}Zr_{0.02})_{7.8}$ and $Sm_{0.5}Pr_{0.5}(Co_{bal}Fe_{0.3}Cu_{0.07}Zr_{0.02})_{7.6}$.

The proportion of rare-earth metal in these compositions is between about 20 and 30% by weight and therefore this type of rare earth magnet conserves resources as compared with the intermetallic compound magnets described in paragraph 1; and 3. Intermetallic compound magnets including at least one rare-earth metal in an amount between about 8 and 18 atomic percent, iron or other transition metal in an amount between about 73 and 88 atomic percent and boron or other sub-metal or semiconductor element such as arsenic, antimony, bismuth, boron, carbon, silicon, phosphorus or selenium in an amount between about 4 and 9 atomic percent. These magnets have formulas such as $Nd_{15}Fe_{77}B_8$, $Nd_{15}Fe_{73}Co_4B_8$, $Pr_{15}Fe_{77}B_8$ and $Pr_{15}Fe_{80}B_5$. These magnets have the best performance of all of the magnets since they have a large saturation magnetization ($4\pi Is$) and a large anisotropic magnetic field (Ha).

The invention will be better understood with reference to the following examples. These examples are presented for purposes of illustration only and are not intended to be construed in a limiting sense.

EXAMPLE 1

A composition having the atomic percentages $Nd_{14}Fe_{80}B_6$ was used to form a permanent magnet material. Rapidly quenched thin fragments of the composition were pulverized to a particle diameter of less than about 177 μm. An epoxy resin was admixed with the magnetic material and the mixture was press-molded to obtain a molded body. The molded body was heat treated at a temperature of 155° C. for about 1 hour in order to obtain a powder bonded permanent magnet. The powder bonded permanent magnet was coated with the coating materials and in the thicknesses shown in Table 1.

TABLE 1

| Sample No. | Coating Material | Weight Ratio | Thickness of Coating Layer (μm) |
|---|---|---|---|
| 1 | epoxy resin/PTFE | 99:1 | 10 |
| 2 | epoxy resin/PTFE | 98:2 | 8 |
| 3 | epoxy resin/PTFE | 95:5 | 0.5 |
| 4 | epoxy resin/PTFE | 80:20 | 10 |
| 5 | epoxy resin/PTFE | 70:30 | 20 |
| 6 | phenol resin/PCTFE | 60:40 | 10 |
| 7 | phenol resin/PFA | 60:40 | 12 |
| 8 | phenol resin/FEP | 55:45 | 11 |
| 9 | phenol resin/ETFE | 60:40 | 9 |
| 10 | phenol resin/PCTFE | 60:40 | 10 |
| 11 | phenol resin/PTFE | 25:75 | 15 |
| 12 | none | — | — |

The magnet materials had the following magnetic properties:

$BH_{max}$=7.6 $MGO_e$;

Br=5.9 kG;

iHc=15.4 kOe;

bHc=5.3 kOe; and density=6.3 g/$cm^3$

Each of samples 1-12 were exposed at a constant temperature of 60° C. and a constant humidity of 95% for about 1500 hours. The magnetic properties and appearance of the exposed samples are shown in Table 2.

TABLE 2

| Sample No. | Magnetic Properties Br(kG) | bHc(kOe) | iHc(kOe) | BHmax(MGOe) | Corrosion Condition |
|---|---|---|---|---|---|
| 1 | 5.4 | 4.9 | 14.9 | 6.6 | Partial |
| 2 | 5.6 | 5.0 | 15.0 | 7.0 | Minimal |
| 3 | 5.3 | 4.8 | 14.8 | 6.5 | Minimal |
| 4 | 5.7 | 5.3 | 15.3 | 7.5 | None |
| 5 | 5.6 | 5.1 | 15.2 | 7.5 | None |
| 6 | 5.7 | 5.2 | 14.8 | 7.6 | None |
| 7 | 5.7 | 5.1 | 15.1 | 7.4 | None |
| 8 | 5.8 | 5.2 | 15.2 | 7.6 | None |
| 9 | 5.7 | 5.2 | 15.1 | 7.5 | None |
| 10 | 5.7 | 5.2 | 15.3 | 7.5 | None |
| 11 | 5.4 | 4.8 | 14.8 | 6.5 | Partial |

TABLE 2-continued

| Sample No. | Magnetic Properties Br(kG) | bHc(kOe) | iHc(kOe) | BHmax(MGOe) | Corrosion Condition |
|---|---|---|---|---|---|
| 12 | 5.0 | 4.6 | 14.5 | 5.9 | Complete |

As can be seen, samples 2–10 which had coating layers in accordance with the invention maintained their magnetic properties significantly better than samples 1, 11 and 12. In sample 1, the fluorine resin was used in an amount of less than about 2% by weight and in sample 11 the fluorine resin was used in an amount greater than about 70% by weight. Accordingly, each of samples 1 and 11 exhibited poor corrosion resistance. The worst corrosion resistance was exhibited by sample 12 which did not have a coating layer.

EXAMPLE 2

A thin coating layer of $Nd_{0.14}(Fe_{0.94}B_{0.06})_{0.86}$ alloy obtained by a rapidly quenched thin film producing process was pulverized in a ball mill to yield magnetic particles having a thickness of about 177 μm. Between about 1 and 3% by weight epoxy resin bonding material was added to the magnetic particles and the magnetic particles and epoxy resin were milled. The milled magnetic particles and epoxy resin were press-molded to obtain a predetermined molded body. The molded body was cure treated at a temperature of about 150° C. for one hour in order to harden the molded body and yield a magnet.

The magnet was washed with trichloroethylene and PTFE was sprayed on the magnet. The sprayed magnet was sintered at a temperature of about 150° C. for one hour in order to obtain a magnet with a thin coating layer of about 5 μm thickness. PTFE was sprayed on the magnet a second time to increase the thickness of the coating layer to about 10 μm. The magnet was maintained at a temperature of about 60° C. and a relative humidity of about 95% for varying periods of time. Table 3 shows the condition of the magnet and of a comparative sample having no thin coating film after each period of time.

TABLE 3

| Sample | Exposure Time 10 Hours | 100 Hours | 500 Hours |
|---|---|---|---|
| Present Example | No Corrosion | No Corrosion | No Corrosion |
| Comparative Example | Completely Corroded | Completely Corroded | Completely Corroded |

As can be seen from Table 3, high corrosion resistance was observed when a powder bonded permanent magnet was coated with a fluorine resin coating. The uncoated permanent magnet had no corrosion resistance.

EXAMPLE 3

Powder bonded magnets were produced as described in Example 1. The magnets were coated with the fluorine resins FEP, PCTFE and PVDF to a thickness of 10 μm. The coated magnets were exposed at a temperature of about 60° C. and relative humidity of about 95% in order to test their corrosion resistance. The results are shown in Table 4.

TABLE 4

| Sample | Exposure Time 10 Hours | 100 Hours | 500 Hours |
|---|---|---|---|
| FEP | No Corrosion | No Corrosion | No Corrosion |
| PCTFE | No Corrosion | No Corrosion | No Corrosion |
| PVDF | No Corrosion | No Corrosion | No Corrosion |

As can be seen, the fluorine resin coating on the powder bonded permanent magnets provided the magnets with a high degree of corrosion resistance.

EXAMPLE 4

Powder bonded permanent magnets were produced as described in Example 1. The magnets were repeatedly coated with fluorine resin to obtain coatings having thicknesses of 0.5 μm, 1 μm, 10 μm, 30 μm, 50 μm and 70 μm, respectively. The coated magnets were exposed at a temperature of about 60° C. and a relative humidity of about 95%. The results are shown in Table 5.

TABLE 5

| Thickness of Coating Film | Exposure Time 10 Hours | 100 Hours | 500 Hours |
|---|---|---|---|
| 0.5 μm | Complete Corrosion | Complete Corrosion | Complete Corrosion |
| 1.0 μm | Partial Corrosion | Complete Corrosion | Complete Corrosion |
| 10.0 μm | No Corrosion | No Corrosion | Partial Corrosion |
| 30.0 μm | No Corrosion | No Corrosion | Partial Corrosion |
| 50.0 μm | No Corrosion | No Corrosion | No Corrosion |
| 70.0 μm | No Corrosion | No Corrosion | No Corrosion |

As can be seen from Table 5, when the thickness of the coating layer was less than about 1 μm, it was not possible to obtain sufficient corrosion resistance for the coating to be practical. On the other hand, when the thickness of the coating layer was greater than about 50 μm, excellent corrosion resistance was provided. However, thicknesses of greater than about 50 μm are expensive and not practical from the point of view of cost. Fluorine resin coating layer thicknesses between about 1 and 50 μm are preferred in accordance with the invention.

EXAMPLE 5

Two solutions of fluorine resins having different densities were prepared. A first powder bonded permanent magnet was coated once with one of the solutions to provide a coating layer having a thickness of about 10 μm. A second powder bonded permanent magnet was coated 3 times with the other solution to obtain a 10 μm thick coating layer. A test was conducted as described in Example 3 and the results are shown in Table 6.

TABLE 6

| | Exposure Time 10 Hours | 100 Hours | 500 Hours |
|---|---|---|---|
| Single layer coating | No Corrosion | Partial Corrosion | Partial Corrosion |
| Three layer coating | No Corrosion | No Corrosion | No Corrosion |

As can be seen from Table 6, a coating layer obtained by repeated coating processes had superior corrosion resistance when two different coating layers having the same thickness were compared. This is due to generation of pin-holes in the coating layer resulting from vaporization of the solvent during the drying process. However, the pin-holes were filled when the coating process was repeated several times.

EXAMPLE 6

Several types of rare-earth magnets were prepared and coated with layers of epoxy resin, PTFE or PFA. The coated magnets were maintained at a temperature of about 40° C. and a relative humidity of about 95% for 500 hours and the condition of the magnets was observed. The results are shown in Table 7.

TABLE 7

| Sample No. | Magnet Composition | Thickness of Layer (μm) | 40° C. × 95% RH × 500 Hours |
|---|---|---|---|
| S-1 | Sintered $SmCo_5$ | 12 | No Corrosion |
| S-2 | Sintered $Sm(Co_{bal}Cu_{0.06}Fe_{0.16}Zr_{0.01})_{7.6}$ | 14 | No Corrosion |
| S-5 | Sintered $Sm_{6.6}Ce_{0.4}(Co_{bal}Cu_{0.06}Fe_{0.18}Zr_{0.012})_{7.4}$ | 16 | No Corrosion |
| S-7 | Sintered $Nd_{15}Fe_{78}B_7$ | 15 | No Corrosion |
| S-12 | Bonded $Sm(Co_{bal}Cu_{0.08}Fe_{0.02}Zr_{0.028})_{8.3}$ | 15 | No Corrosion |
| S-15 | Bonded $SmCo_5$ | 14 | No Corrosion |
| Comparative Test | Sintered $Nd_{15}Fe_{78}B_7$ | None | Complete Corrosion |
| Comparative Test | Bonded $Sm(Co_{bal}Cu_{0.08}Fe_{0.02}Zr_{0.028})_{8.3}$ | None | Partial Corrosion |

As can be seen from Table 7, no difference in corrosion resistance was observed as a function of whether the magnets were sintered or powder bonded or as a function of the composition of the magnet. Superior effects were obtained by coating the powder bonded permanent magnets with organic resins for interrupting the flow of air and gasses to the magnet. Rust generation was prevented and the surface of the magnet was not damaged by loss of particles.

EXAMPLE 7

Rapidly quenched thin ribbon fragments of an $Nd_{13}Fe_{77}Co_4B_6$ composition were pulverized to a particle diameter of less than about 100 μm. An epoxy resin was mixed with the pulverized fragments and the mixture was press-molded to obtain a molded body. The molded body was heat treated at a temperature of about 125° C. for about 1 hour to obtain powder bonded permanent magnets. Then, epoxy resin is mixed with the permanent magnets. The powder bonded permanent magnets were coated with the coating materials shown in Table 8 to the thicknesses shown.

TABLE 8

| Sample No. | Coating Material | Ratio | Thickness of Coating Layer (μm) |
|---|---|---|---|
| 21 | epoxy resin/PTFE | 99:1 | 10 |
| 22 | epoxy resin/PTFE | 98:2 | 8 |
| 23 | epoxy resin/PTFE | 95:5 | 0.8 |
| 24 | epoxy resin/PTFE | 80:20 | 10 |
| 25 | epoxy resin/PCTFE | 70:30 | 18 |
| 26 | phenol resin/PTFE | 60:40 | 10 |
| 27 | phenol resin/PFA | 50:50 | 12 |
| 28 | phenol resin/FEP | 60:40 | 20 |
| 29 | phenol resin/ETFE | 55:45 | 9 |
| 30 | phenol resin/PCTFE | 60:40 | 11 |
| 31 | phenol resin/PTFE | 25:75 | 15 |
| 32 | none | — | — |

The magnets had the following magnetic properties:

$BH_{max}$=11.0 MGOe;
Br=7.2 kG;
iHc=9.8 kOe;
bHC=5.0 kOe; and
density=6.4 g/cm$^3$ Each of samples 21–32 were exposed at a constant temperature of 60° C. and a constant relative humidity of 95% for about 1500 hours. The magnetic properties and appearance of the exposed samples are shown in Table 9.

TABLE 9

| Sample No. | Magnetic Properties Br(kG) | bHc(kOe) | iHc(kOe) | BHmax(MGOe) | Corrosion Condition |
|---|---|---|---|---|---|
| 21 | 6.8 | 4.6 | 9.4 | 8.6 | Partial |
| 22 | 6.8 | 4.8 | 9.7 | 8.9 | Minimal |
| 23 | 6.9 | 4.8 | 9.6 | 9.2 | Minimal |
| 24 | 7.1 | 5.0 | 9.8 | 10.7 | None |
| 25 | 7.2 | 4.9 | 9.7 | 10.9 | None |
| 26 | 7.1 | 5.1 | 9.9 | 11.0 | None |
| 27 | 7.1 | 4.8 | 10.0 | 10.9 | None |
| 28 | 7.2 | 4.9 | 9.8 | 10.9 | None |
| 29 | 7.2 | 4.8 | 9.8 | 10.8 | None |
| 30 | 7.2 | 5.0 | 9.8 | 10.9 | None |
| 31 | 6.9 | 4.8 | 9.5 | 8.5 | Partial |
| 32 | 6.5 | 4.5 | 9.2 | 7.9 | Complete |

As can be seen from Table 9, Sample 21 which had less than about 2% by weight fluoroplastic and Sample 31 which had greater than about 70% by weight fluoroplastic in the coating composition had poor corrosion resistance. Sample 32 which had no coating also had no corrosion resistance. Samples 22–30 having between about 2 and 75% by weight organic resin in the coating composition performed well even after 1500 hours.

EXAMPLE 8

An $Nd_{0.14}(Fe_{0.89}Co_{0.05}B_{0.06})_{0.86}$ alloy composition obtained by a rapidly quenched thin film producing process was pulverized in a ball mill to obtain magnetic particles having a thickness of about 90 μm. Between about 1 and 3% by weight epoxy resin was added to the magnetic particles and the mixture was milled. The milled magnetic particles were press-molded to yield a molded body. The molded body was cure treated at a temperature of about 150° C. for about one hour in order to harden the body and obtain a magnet.

The magnets were washed with trichloroethylene and sprayed with PTFE. The PTFE coated magnets were sintered at a temperature of about 150° C. for about one hour and a thin coating layer having a thickness of about 5 μm was obtained on the magnet. PTFE was sprayed a second time to provide a thin coating layer having a thickness of about 10 μm. The magnet was compared with a comparative sample which did not have a coating layer. The coated magnet and comparative sample were maintained at a temperature of about 60° C. and relative humidity of about 95%. The results are shown in Table 10.

TABLE 10

| Sample | Exposure Time | | |
|---|---|---|---|
| | 10 Hours | 100 Hours | 500 Hours |
| Present Example | No Corrosion | No Corrosion | No Corrosion |
| Comparative Example | Completely Corroded | Completely Corroded | Completely Corroded |

As can be seen from Table 10, a high degree of corrosion resistance was observed when a powder bonded permanent magnet was coated with PTFE.

EXAMPLE 9

Powder bonded permanent magnets were produced as described in Example 7. The magnets were coated with FEP, PCTFE and PVDF, respectively, to a thickness of 10 μm. The coated magnets were exposed at a temperature of about 60° C. and a relative humidity of about 95% in order to test the corrosion resistance. The results are shown in Table 11.

TABLE 11

| Sample | Exposure Time | | |
|---|---|---|---|
| | 10 Hours | 100 Hours | 500 Hours |
| FEP | No Corrosion | No Corrosion | No Corrosion |
| PCTFE | No Corrosion | No Corrosion | No Corrosion |
| PVDF | No Corrosion | No Corrosion | No Corrosion |

As can be seen from Table 11, high corrosion resistance was observed when magnets were coated with FEP, PCTFE or PVDF.

EXAMPLE 10

Powder bonded permanent magnets were produced as described in Example 7. The magnets were repeatedly coated with fluorine resin to obtain fluorine resin coating layers having thicknesses of 0.5 μm, 1 μm, 10 μm, 30 μm, 50 μm and 70 μm, respectively. The magnets were exposed at a temperature of about 60° C. and a relative humidity of about 95%. The results are shown in Table 12.

TABLE 12

| Thickness of Coating Film | Exposure Time | | |
|---|---|---|---|
| | 10 Hours | 100 Hours | 500 Hours |
| 0.5 μm | Complete Corrosion | Complete Corrosion | Complete Corrosion |
| 1.0 μm | No Corrosion | Partial Corrosion | Complete Corrosion |
| 10 μm | No Corrosion | No Corrosion | No Corrosion |
| 30 μm | No Corrosion | No Corrosion | Partial Corrosion |
| 50 μm | No Corrosion | No Corrosion | No Corrosion |
| 70 μm | No Corrosion | No Corrosion | No Corrosion |

As can be seen from Table 12, when the thickness of the coating layer was less than or equal to about 1 μm, good corrosion resistance was not observed. When the thickness of the coating layer was greater than about 50 μm, good corrosion resistance was observed, but thicknesses greater than about 50 μm are not practical from the point of view of manufacturing cost.

EXAMPLE 11

Rapidly quenched thin fragments having the composition $Nd_{13}Fe_{74}Co_{7}B_{6}$ were pulverized to a particle diameter of less than about 120 μm. The particles were mixed with an epoxy resin and pressmolded to obtain a molded body. The molded body was heat treated at a temperature of 160° C. for about 1 hour to obtain a powder bonded permanent magnet. The powder bonded permanent magnet was coated with the coating materials shown in Table 13.

TABLE 13

| Sample No. | Coating Material | Weight Ratio | Thickness of Coating Layer (μm) |
|---|---|---|---|
| 41 | polyester resin/PTFE | 99:1 | 12 |
| 42 | polyester resin/PTFE | 98:2 | 7 |
| 43 | polyester resin/PTFE | 95:5 | 0.6 |
| 44 | polyester resin/PTFE | 80:20 | 10 |
| 45 | polyester resin/PCTFE | 70:30 | 15 |
| 46 | polyester resin/PTFE | 60:40 | 11 |
| 47 | phenol:epoxy(50:50)/PFA | 60:40 | 13 |
| 48 | polyester:epoxy(50:50)/FEP | 60:40 | 20 |
| 49 | polyester:phenol(40:60)/ETFE | 60:40 | 8 |
| 50 | phenol:polyester:epoxy (20:30:50)/PCTFE | 60:40 | 10 |
| 51 | phenol:polyester:epoxy (20:30:50)/PTFE | 25:75 | 13 |
| 52 | none | — | — |

The magnets had the following magnetic properties:
$BH_{max}$=11.5 MGOe;
Br=7.4 kG;
iHc=9.4 kOe;
bHc=4.8 kOe; and
density=6.6 g/cm$^3$.

Each of samples 41 to 52 was exposed at a constant temperature of about 60° C. and constant relative humidity of about 95% for about 1500 hours. The magnetic properties and appearance of the exposed samples are shown in Table 14.

TABLE 14

| Sample No. | Magnetic Properties | | | | Corrosion Condition |
|---|---|---|---|---|---|
| | Br(kG) | bHc(kOe) | iHc(kOe) | BHmax(MGOe) | |
| 41 | 6.9 | 4.7 | 8.5 | 9.6 | Partial |
| 42 | 7.0 | 4.7 | 8.9 | 10.0 | Minimal |
| 43 | 6.9 | 4.7 | 8.8 | 10.4 | Minimal |
| 44 | 7.4 | 4.9 | 9.1 | 11.4 | None |
| 45 | 7.3 | 4.8 | 9.0 | 11.5 | None |
| 46 | 7.4 | 4.8 | 8.9 | 11.3 | None |
| 47 | 7.4 | 4.9 | 9.2 | 11.3 | None |
| 48 | 7.4 | 4.9 | 9.1 | 11.2 | None |
| 49 | 7.4 | 4.8 | 9.1 | 11.4 | None |
| 50 | 7.4 | 4.8 | 9.2 | 11.4 | None |
| 51 | 7.1 | 4.7 | 8.9 | 10.5 | Partial |
| 52 | 6.6 | 4.7 | 8.0 | 8.9 | Complete |

As can be seen from Table 14, Sample 41 had an amount of polyester resin in the coating composition of less than about 2% by weight and Sample 51 had an amount of phenol:polyester:epoxy resin of greater than about 70% by weight. Both of these samples exhibited poor corrosion resistance. Sample 52 which had no coating layer also had no corrosion resistance. The amount of epoxy resin in the coating composition is preferably between about 2 and 70% by weight.

Permanent magnets coated with waterproof organic coating compositions in accordance with the invention have a high degree of corrosion resistance and are suitable for practical use. The magnet material can be powder bonded, sintered or cast and the organic resin coating preferably includes a fluorine resin which can be used alone or mixed with an additional organic resin such as an epoxy, polyester or phenol resin. If the fluorine resin is mixed with an additional organic resin, the amount of fluorine resin should be between about 2 and 70% by weight of the total coating mixture.

It is possible to achieve a high degree of reliability for an extended period of time when these permanent magnets are used in speakers, motors, meters and the like. Stability is also achieved. It is also possible to provide magnetic circuits having a high degree of accuracy and high efficiency.

Magnets provided in accordance with the invention have a high temperature and corrosion resistance and accordingly, a broad range of applications. The organic coating compositions prepared in accordance with the invention prevent magnetic particles from being dislodged from the magnet and prevent cracking of the magnet. Additionally, the stability and resistance of the magnet to heat as well as the strength of a device in which such magnets are utilized can be enhanced.

It will thus be seen that the objects set forth above, among those made apparent from the preceding description, are efficiently attained and, since certain changes may be made in the above article without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A resin coated permanent magnet comprising a permanent magnet coated with a waterproof organic resin coating including a fluorine containing resin.

2. The resin coated magnet of claim 1, wherein the permanent magnet is a R-Fe-B permanent magnet wherein R is at least one rare earth metal element.

3. The resin coated magnet of claim 1, wherein the permanent magnet member is a powder bonded magnet.

4. The permanent magnet of claim 3, wherein the powder bonded permanent magnet is selected from the group consisting of intermetallic compounds formed from a rare earth metal and cobalt; rare-earth transition metal intermetallic compounds; and intermetallic compounds including at least one rare-earth metal in an amount between about 8 and 18 atomic percent, iron or other transition metal in an amount between about 73 and 88 atomic percent and boron or other sub-metal or semi-conductor element in an amount between about 4 and 9 atomic percent.

5. The permanent magnet of claim 3, wherein the powder bonded permanent magnet member is formed by:

pulverizing a magnetic alloy composition to obtain magnetic particles;

mixing the magnetic particles with a thermosetting resin to obtain a mixture;

press molding the mixture to obtain an ingot; and hardening the ingot to obtain the powder bonded magnet.

6. The permanent magnet of claim 5, wherein the thermosetting resin is an epoxy resin.

7. The permanent magnet of claim 5, wherein the coating has a thickness between about 1 and 50 μm.

8. The permanent magnet of claim 1, wherein the permanent magnet member is a sintered magnet.

9. The permanent magnet of claim 1, wherein the permanent magnet member is a cast magnet.

10. The permanent magnet of claim 1, wherein the fluorine resin is selected from the group consisting of 4-fluorinated ethylene resin; a copolymer resin of 4-fluorinated ethylene and perfluoroalkoxyethylene; a copolymer resin of 4-fluorinated ethylene and 6-fluorinated propylene; a copolymer resin of 4-fluorinated ethylene, 6-fluorinated propylene and perfluoroalkoxyethylene; a copolymer resin of 4-fluorinated ethylene and ethylene; a copolymer resin of 3-fluorinated ethylene chloride; a copolymer resin of 3-fluorinated ethylene chloride and ethylene; fluorinated vinylidene resin; fluorinated vinyl resin and mixtures thereof.

11. The permanent magnet of claim 1, wherein the fluorine resin is admixed with a second organic resin.

12. The permanent magnet of claim 11, wherein the coating has a thickness between about 1 and 50 μm.

13. The permanent magnet of claim 11, wherein the second organic resin is selected from the group consisting of epoxy resins, polyester resins, acrylic resins, phenol resins and mixtures thereof.

14. The permanent magnet of claim 11, wherein the amount of fluorine resin is between about 2 and 70% by weight of the total resin composition.

15. The permanent magnet of claim 1, wherein the coating has a thickness between about 1 and 50 μm.

16. A resin coated rare-earth permanent magnet comprising a R-Fe-B magnet member coated with a water proof organic resin coating including at least one fluorine containing resin, wherein R is at least one rare earth metal element.

17. A process for preparing a coated permanent magnet which comprises:

forming a permanent magnet member by one of sintering, powder bonding or casting; and coating the magnet member with a waterproof organic resin composition including a fluorine containing resin by one of spraying, repeated spraying, or chemical action sufficient to render the magnet member waterproof.

* * * * *